United States Patent [19]

Isoda

[11] Patent Number: 5,475,294
[45] Date of Patent: Dec. 12, 1995

[54] CHARGE CONTROLLER FOR BATTERY CHARGER

[75] Inventor: Takuya Isoda, Kitaibaraki, Japan

[73] Assignee: Nippon Densan Corporation, Kyoto, Japan

[21] Appl. No.: 990,525

[22] Filed: Dec. 15, 1992

[30] Foreign Application Priority Data

Dec. 27, 1991 [JP] Japan .................................... 3-358353
Feb. 3, 1992 [JP] Japan .................................... 4-046419

[51] Int. Cl.$^6$ .............................. H01M 10/46; H02J 7/10
[52] U.S. Cl. .................................. 320/14; 320/22; 320/39
[58] Field of Search ............................... 320/5, 9, 14, 21, 320/22, 23, 24, 39, 40, 48

[56] References Cited

U.S. PATENT DOCUMENTS

| | | | |
|---|---|---|---|
| 4,302,714 | 11/1981 | Yefsky | 320/5 |
| 4,385,269 | 5/1983 | Aspinwall et al. | 320/14 |
| 4,609,860 | 9/1986 | Fasen | 320/14 |
| 4,668,901 | 5/1987 | Furukawa | 320/21 X |
| 5,180,961 | 1/1993 | Tsujino | 320/39 X |

*Primary Examiner*—Peter S. Wong
*Assistant Examiner*—Ed Tso
*Attorney, Agent, or Firm*—McCormick, Paulding & Huber

[57] ABSTRACT

For charging a storage battery, e.g. a nickel-cadmium cell, recharging is conducted after the battery is forcibly discharged while the charge voltage stays in a specified range after a period of time from the start of the charging action. Accordingly, the generation of memory effect will be avoided. The charging will successfully be carried out without declining the storage capacity of the battery. In both charge and adaptor modes, output voltage and current are examined whether the battery is coupled correctly or not and if not, their delivery is canceled with producing an alarm display. As the result, the charging to the battery and the power supply to an external electric appliance will be implemented without error.

10 Claims, 5 Drawing Sheets

CHARGE CONTROLLER FOR BATTERY CHARGER

FIELD OF THE INVENTION

The present invention relates to a battery charger for charging a storage (or secondary) battery, e.g. a nickel-cadmium or lead cell.

DESCRIPTION OF THE PRIOR ART

Secondary batteries such as nickel-cadmium cells are designed for repeat use through recharging after discharge and widely employed as substitute electrical supplies in motor vehicles and power sources for energizing portable small-sized appliances.

A battery charger for charging such secondary batteries is disclosed in U.S. Pat. No. 4,668,901 which comprises a circuit for converting a commercial ac input to a desired dc output, a circuit for supplying the dc output to a battery, a circuit for detecting a potential between the two terminals of the battery or a charge voltage, a circuit for controlling the charging action with the detected charge voltage, and so on.

In general, the secondary batteries to be charged tend to exhibit an abrupt drop in the charge voltage during charging and create so-called memory effect causing imperfect discharge.

The traditional battery charger is however arranged to charge the secondary battery at a constant rate regardless of the level of discharge, thus producing the memory effect, declining the storage capacity, and shortening the operating life.

Also, another battery charger is known which also serves as a dc power source or adaptor. This type of the battery charger changes a commercial ac voltage to a desired level and converts it to a dc form in the charge mode for charging a storage battery coupled between the two output terminals. In the adaptor mode, it converts the same to a desired dc voltage which is then supplied through the output terminal to an external electric appliance.

The known battery charger however has some disadvantages. Unless the charger is securely connected to a battery, its charging action will fail. If the output voltage of the charger in the adaptor mode is accidentally increased due to an internal fault in the charger, it may cause damage to the electric appliance to be energized.

SUMMARY OF THE INVENTION

It is an object of the present invention to provide a battery charger capable of charging a battery without declining the storage capacity and shortening the life of the same.

It is another object of the present invention to provide a battery charger having a protective function for detection of faults or abnormalities during the charging operation or serving as an adapter.

Other objects and features of the present invention will be apparent from the following description.

DETAILED DESCRIPTION OF THE PREFERRED EMBODIMENTS

Preferred embodiments of the present invention will be described in more detail referring to the accompanying drawings.

First Embodiment

A first embodiment of the present invention will now be described in the form of a battery charger referring to FIGS. 1 to 3.

Figure 1:
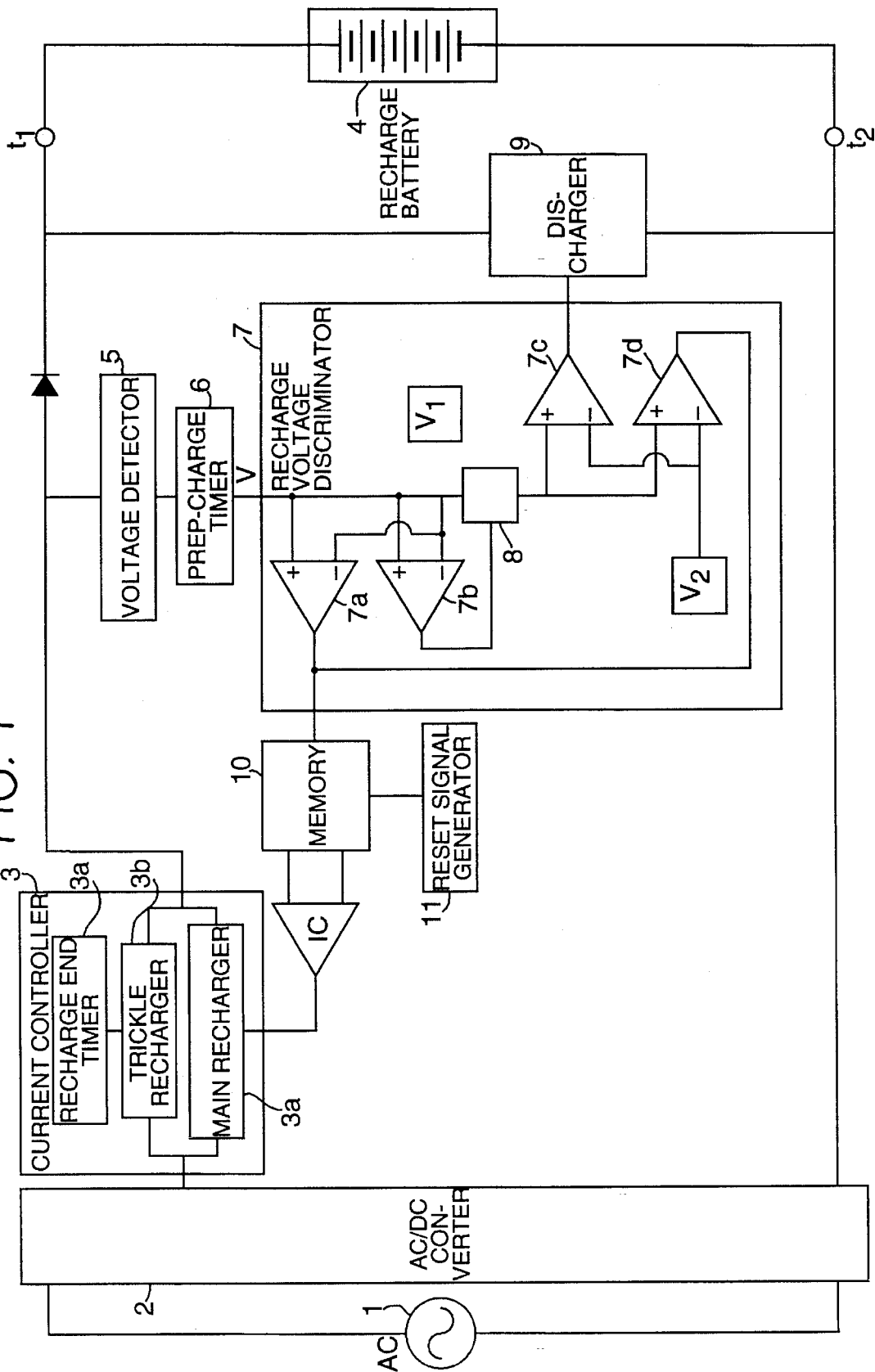
FIG. 1 is a block diagram of a battery charger showing a first embodiment of the present invention.
Figure 2:
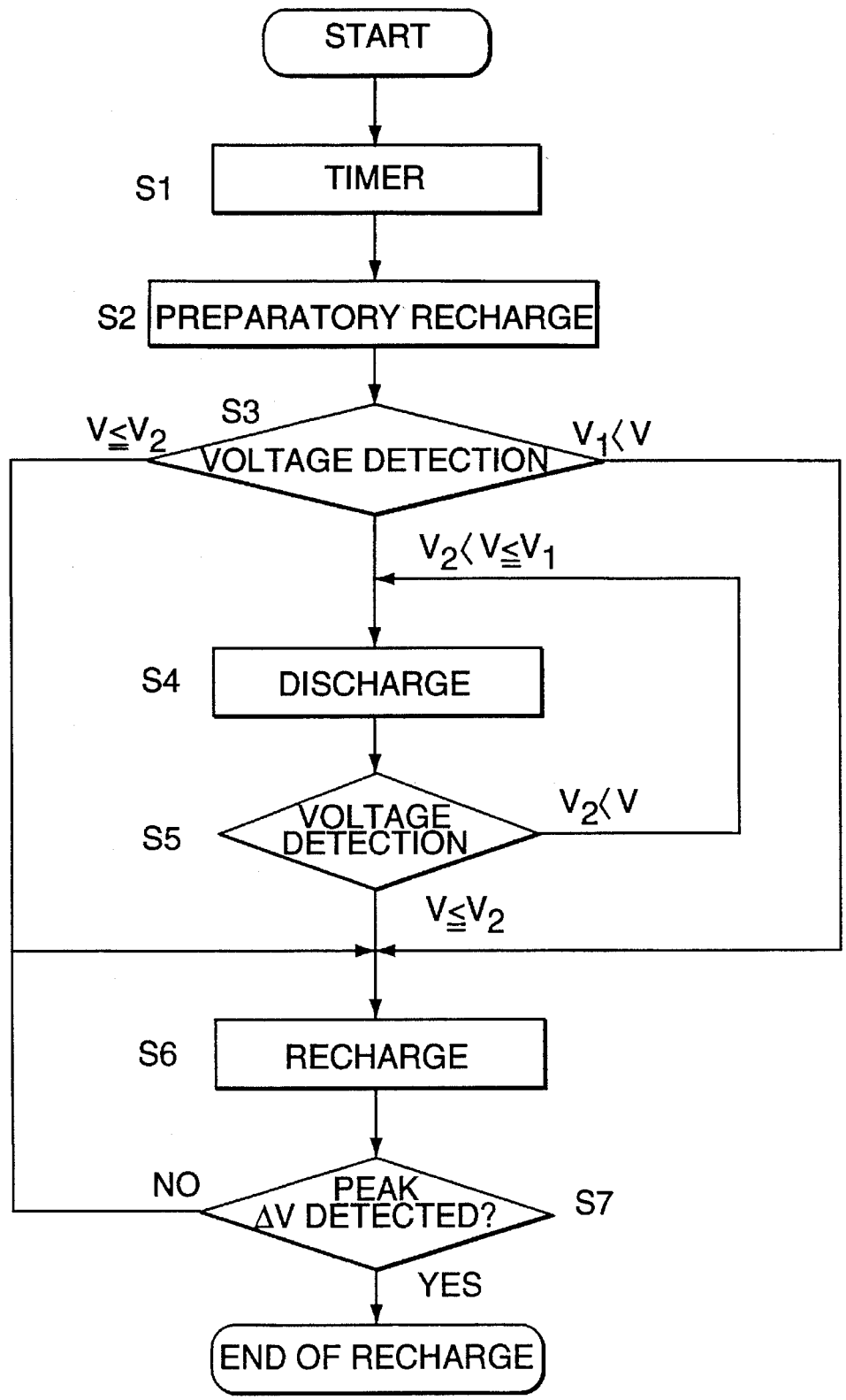
FIG. 2 is a flow chart showing a charging action of the battery charger of FIG. 1.

The battery charger illustrated in FIG. 1 has a dc converter circuit 2 for converting an ac output of an ac source 1 into a dc voltage to charge a battery. The dc converter circuit 2 may be a switch regulator comprising switch transistors and a high-frequency transformer for producing a desired dc voltage.

Also, a current controller circuit 3 is provided for controlling a charge voltage to the battery 4 coupled between two terminals t1 and t2. The current controller circuit 3 comprises a main charge circuit 3a for main charging action, a trickle charge circuit 3b for supply of a trickle current to the battery 4, and a charge end timer circuit 3c for predetermining a maximum charge time (up to 20 hours). In action, the trickle charge circuit 3b will start trickle charging after the main charging action is completed. Upon finishing of the maximum charge time, the timer circuit 3c stops the trickle charging for energy saving.

A voltage detector circuit 5 is provided for detecting a charge voltage V to the battery 4 during the charging. The charge voltage V detected by the voltage detector circuit 5 is transmitted via a preparatory charge timer circuit 6 to a charge voltage examining circuit 7. The preparatory charge timer circuit 6 produces a preparatory charge time and after the preparatory charge time elapsed from the start of the charging, allows the charge voltage V from the voltage detector circuit 5 to pass to the charge voltage examining circuit 7 for activation.

The charge voltage examining circuit 7 contains four comparator circuits 7a, 7b, 7c, 7d. The first and second comparator circuits 7a, 7b compare the charge voltage V supplied through the preparatory charge timer circuit 6 with the upper limit value $V_1$ of a specified voltage range. More specifically, the first comparator circuit 7a delivers a decision signal when $V \geq V_1$ and the second comparator circuit 7b delivers a decision signal when $V < V$. The third and fourth comparator circuits 7c, 7d compare the charge voltage V supplied through a switch circuit 8 from the preparatory charge timer circuit 6 with the lower limit value $V_2$ of the same voltage range. When $V \geq V_2$, the third comparator circuit 7c delivers a decision signal. When $V < V_2$, the fourth comparator circuit 7d delivers a decision signal. The switch circuit 8 is activated by the decision signal of the second comparator circuit 7b to pass the charge voltage V to the third and fourth comparator circuits 7c, 7d.

A discharge circuit 9 is provided for forcibly discharging the battery 4 coupled between the two terminals t1 and t2 and comprises a load for consumption of the stored energy of the battery 4 and a switch circuit for connecting and disconnecting a line between the battery 4 and the load. The switch circuit in the discharge circuit 9 is activated by the decision signal of the third comparator circuit 7c to start the discharging.

The decision signals of the first and fourth comparator circuits 7a, 7d are transmitted to a memory circuit 10. The memory circuit 10 controls the current controller circuit 3 by way of an IC device. In action, the memory circuit 10 upon detecting the completion of the charging transmits a reset signal from a reset signal circuit 11 to the current controller circuit 3. As shown in FIG. 3, the charge voltage V increases as the charging action proceeds and reaches a peak level near the end of the charging before decreasing. The memory circuit 10 detects the completion of the charging through measuring a voltage drop ΔV from the peak level of the charge voltage V, thus delivering the reset signal. The voltage drop ΔV may vary depending on a type of the battery 4 to be recharged and in this embodiment, ranges 60 to 100 mV for indicating the end of the charging.

The charging action of the battery charger of the first embodiment to the battery 4 will now be explained referring to FIGS. 2 and 3.

The charging to the battery 4 coupled between the two terminals t1 and t2 starts with preparatory charging for a period (about one minute) predetermined by the preparatory charge timer circuit 6 as executed at Steps S1 and S2. After completion of the preparatory charging, the procedure advances to Step S3 where the charge voltage V is measured with the voltage detector circuit 5.

If the first comparator circuit 7a detects that the charge voltage V is higher than the upper limit value $V_1$ ($V_1 < V$) of the specified voltage range, the procedure goes to Step S6 to continue the charging. If the memory circuit 10 detects a drop ΔV in the charge voltage V at Step S7, it transmits a reset signal to the current controller circuit 3 to disconnect the main charge circuit 3a which thus stops the main charging action. After the main charging action is canceled, the trickle charging is started by the trickle charge circuit 3b.

Figure 3:
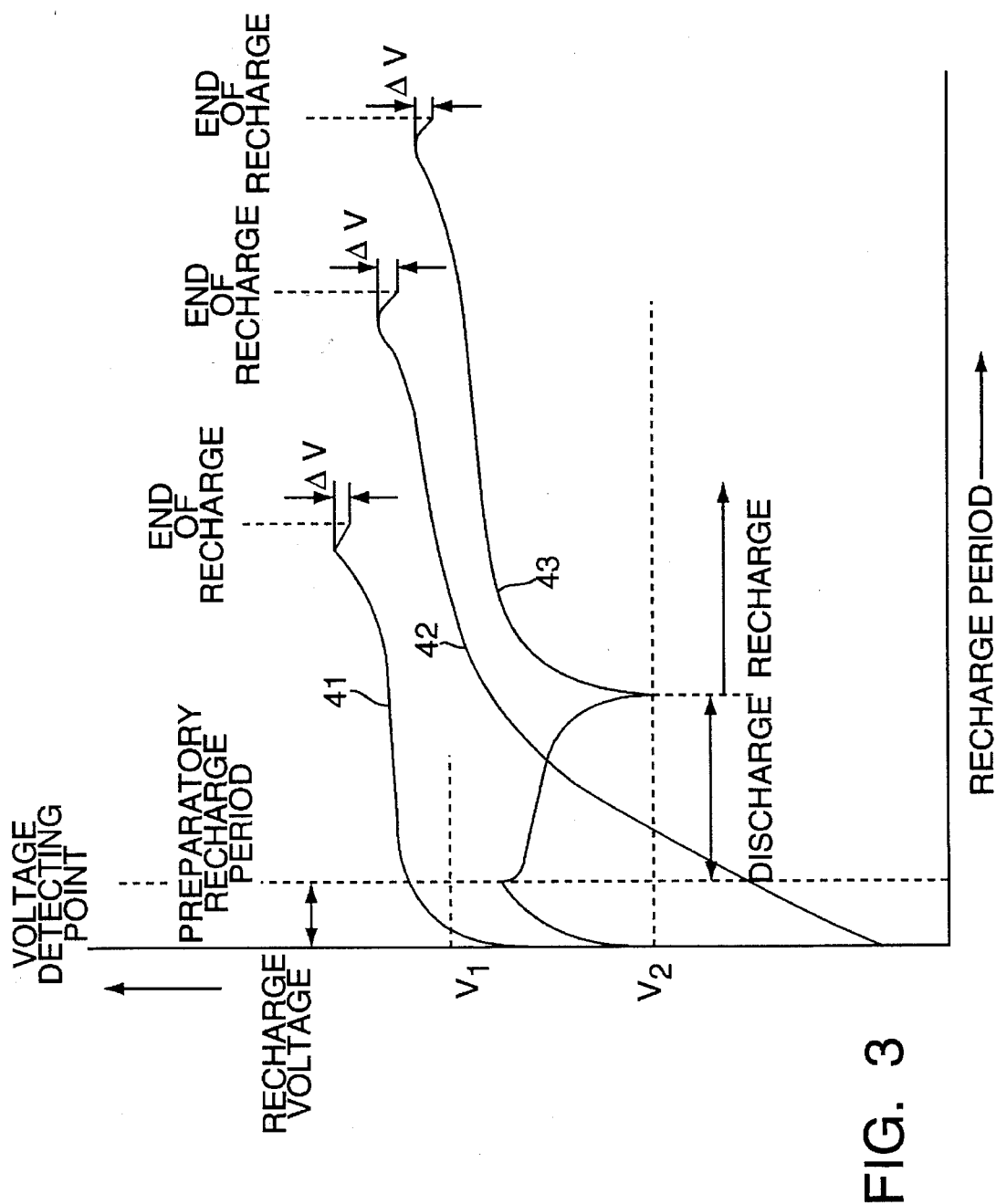
FIG. 3 is a characteristic diagram of a charge voltage of the battery charger of FIG. 1.

This series of the charging steps is expressed by the curve line 41 of FIG. 3. When the battery 4 to be recharged remains not discharged but in an almost fully charged state, such recharging after systematic discharging will not only take a considerable length of time but also result in energy loss. The battery charger of the present invention however performs a direct charging action without any discharging with the discharge circuit 9, thus causing no loss in both the time and energy.

If the second comparator circuit 7b detects at Step S3 that the charge voltage V is not higher than the upper limit value $V_1$ after the preparatory charging ($V \leq V_1$), it sends a decision signal to the switch circuit 8 which in turn actuates the third and fourth comparator circuits 7c, 7d for examining whether the charge voltage V is less than the lower limit value $V_2$ of the specified voltage range. If the charge voltage V is not higher than $V_2$ ($V \leq V_2$), the procedure moves to Step S6 to continue the charging.

This series of the steps is expressed by the curve line 42 of FIG. 3. As apparent from the curve line 2, recharging which starts in a discharged state will rarely create a memory effect. Accordingly, the duration of charging becomes shorts with no repeat of the discharging.

If the second and third comparator circuits 7b, 7c detect at Step S3 that the charge voltage V stays in the specified voltage range after the preparatory charging, i.e. the charge voltage V is higher than the lower limit value $V_2$ but not higher than the upper limit value $V_1$ ($V_2 < V \leq V_1$), the procedure goes to Step S4 where the discharge circuit 9 is activated for discharging the battery 4 by making a closed circuit between the discharge circuit 9 and the battery 4. When it is detected at Step S5 that the battery 4 is in a fully discharged state as the charge voltage V decreases down to the lower limit value $V_2$, the procedure moves to Steps S6 and S7 to perform the recharging.

This series of the steps is expressed by the curved line 43 of FIG. 3. In this case where the battery 4 is in neither fully charged nor discharged state, the battery 4 is discharged to a given level for initiation before being recharged, whereby the generation of memory effect will be avoided.

The battery charger of the first embodiment allows the battery 4 to be fully discharged before being recharged, thus preventing cycles of deficient discharge and recharge which result in an abrupt decrease in the charge voltage during charging or memory effect reducing the storage capacity of a battery. Also, the discharge is conducted only when the charge voltage V to the battery 4 is in the specified voltage range after preparatory charging and thus, such loss in the charging time and energy as forcibly discharging a fully loaded battery will be avoided. Furthermore, the battery 4 of which energy has been used up is immediately recharged without further discharging thus minimizing the charging time.

The upper and lower limit values $V_1$, $V_2$ of the specified voltage range to be examined may arbitrarily be determined depending on a type of the battery and also, the duration of preparatory charging may be determined as desired.

Second Embodiment

A battery charger of a second embodiment of the present invention will be described referring to FIGS. 4 and 5.

Figure 4:
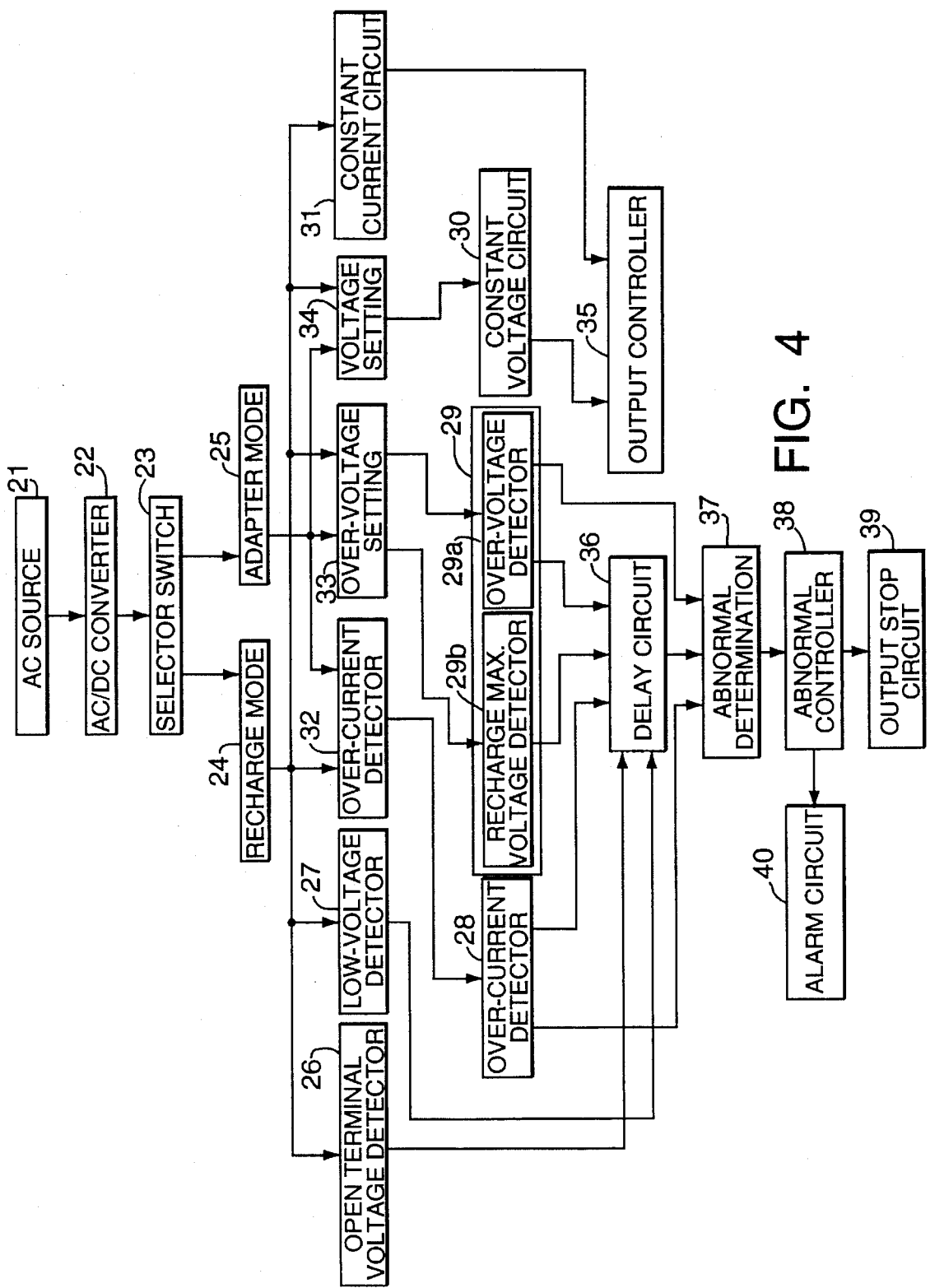
FIG. 4 is a schematic block diagram of a battery charger showing a second embodiment of the present invention.
Figure 5:
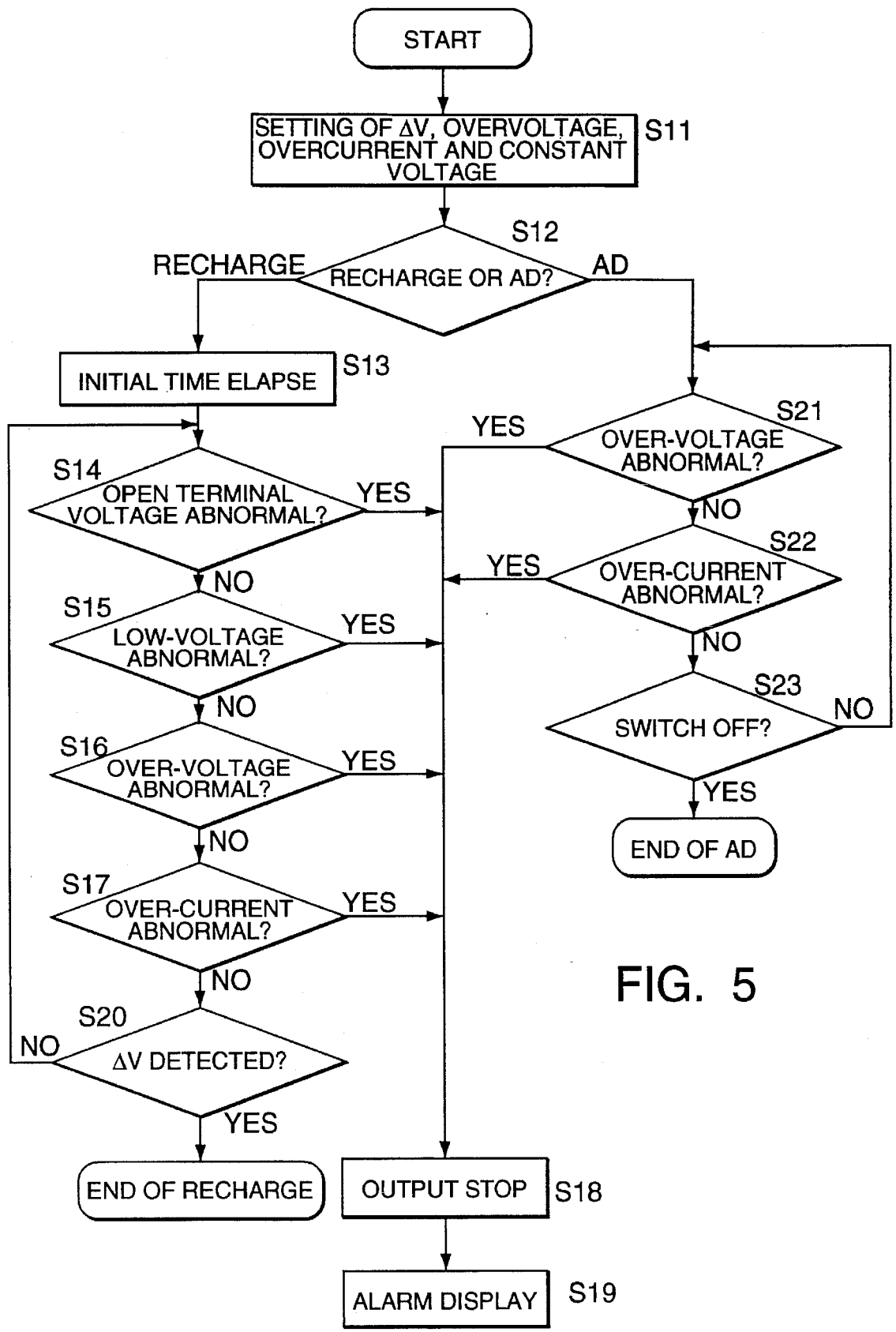
FIG. 5 is a flow chart showing a charging action of the battery charger of FIG. 4.

The battery charger illustrated in FIG. 4 is associated with a charge mode for charging a battery coupled between the output terminals and an adaptor mode for supplying a dc output to an external electric appliance through the output terminals.

There is provided a dc converter circuit 22 for converting an ac output of an ac source 21 to a dc voltage. The dc converter circuit 22 may be a switch regulator which comprises switching transistors and a high-frequency transformer to produce a desired dc voltage. The dc voltage is selectively distributed by a selector switch 23 to a charge mode circuit 24 and an adaptor mode circuit 25.

The charge mode circuit 24 charges a battery coupled between the output terminals through imposing a charge voltage, in which the charging action will be ceased upon detection of a predetermined level of the charge voltage. In the charging, the charge voltage increases to a peak value at the completion of the charging and then, decreases gradually. Accordingly, the peak value of the charge voltage is held at a fully charged condition and when the charge voltage is decreased by a given value (ΔV) from its peak value, it is determined that the battery is fully charged and the charging action is ceased. The charge mode circuit 24 is also arranged to continue a trickle charging action after the completion of the main charging action.

The charge voltage in the second embodiment varies within a range between 14 V and 15 V.

The adaptor mode circuit 25 supplies a dc output to an electric appliance through the output terminals as serving as a dc power source for directly transmitting the dc voltage output of the dc converter circuit 22.

The charge mode circuit 24 is connected to an open terminal voltage detector circuit 26, a low-voltage detector circuit 27, an over-current detector circuit 28, an over-voltage detector circuit 29, a constant voltage circuit 30, and a constant current circuit 31. The adaptor mode circuit 26 is connected to the over-current circuit 28, the over-voltage circuit 29, and the constant voltage circuit 30.

The open terminal voltage detector circuit 26 examines whether the charge voltage stays in an open terminal voltage range (from 21 to 23 V in the embodiment) for seconds or not during the charging. If so, it is determined that the charging action started with no battery coupled between the two output terminals.

The low-voltage detector circuit 27 examines whether the charge voltage stays lower than the lower limit value (9V in the embodiment) of a specified voltage range for seconds or not. For example, the charge voltage fails to rise to the specified voltage range when some of cells in the battery are short-circuited. Accordingly, such a defect or fault will be detected by the low-voltage detector circuit 27.

The over-current detector circuit 28 examines whether the charge current stays in a specified ampere range (2.7 to 3 A in the embodiment) predetermined by an over-current setting circuit 32 for seconds or not. For example, a flow of over-current appears in the charge mode when the battery charger has a defect or fault. Such abnormality will be detected by the over-current detector circuit 28 which in turn produces a detection signal indicating the presence of abnormality.

In the adaptor mode, a flow of over-current may be caused by a defect or fault in the charger or another external appliance coupled to the charger. If the adaptor current exceeds the specified ampere range predetermined by the over-current setting circuit 32 (or more than 110% of the rated current of the appliance coupled to the output terminals) for seconds, the over-current detector circuit 28 produces an abnormality signal.

The over-voltage detector circuit 29 examines whether the charge voltage or adaptor voltage is higher than a voltage level predetermined by an over-voltage setting circuit 33 or not. The over-voltage detector circuit 29 comprises an over-voltage circuit 29a and a maximum charge voltage detector circuit 29b for detecting a maximum value of the charge voltage in the charge mode.

If the battery is incorrectly coupled between the two output terminals in the charging, the charge voltage exceeds a limit value of the specified voltage range. This is detected by the over-voltage circuit 29a (which interprets the detected voltage of more than 21 V as a battery connecting fault in the embodiment). When the charge voltage exceeds the maximum level (19 V plus 0.7 or minus 0.3 in the embodiment), the maximum charge voltage detector circuit 29b determines that the battery has fully been charged regardless of no detection of the voltage drop $\Delta V$. Accordingly, the action will be shifted from the main charging to the trickle charging.

In the adaptor mode, the supply voltage becomes higher than a rated value when an output controller circuit 35 has a detect. This will be detected with the over-voltage circuit 29a measuring the supply voltage which stays higher than the rated value (14 V in the embodiment) predetermined by the over-voltage setting circuit 33 for seconds.

The constant voltage circuit 30 actuates an output controller circuit 35 to control the output voltage at the output terminal to a constant level predetermined by a voltage setting circuit 34 by feedback of the output in the charge or adaptor mode.

The constant current circuit 31 allows the output controller circuit 35 to control the charge current to a constant value in the charge mode because a change in the charge current causes charge voltage variation resulting in false detection of $\Delta V$.

The detector circuits 26,27,29,29 all are coupled to an abnormal examining circuit 37. In the charge mode, each detection signal is transmitted via a delay circuit 36 to the abnormal examining circuit 37. The delay circuit 36 delays the action of the abnormal examining circuit 37 a given period according to outputs of the detector circuits 26,27,28,29. It is common in the charge mode that the charge voltage remains unstable at the beginning of the charging action and may abruptly be decreased rather than increased. For this end, the outputs of the detector circuits 26,27,28,29 are examined not in the beginning of the charging action but after a delay of the period or when the charge voltage comes stable.

In the adaptor mode, the action of the abnormal examining circuit 37 is directly executed with no use of the delay circuit 36.

An abnormal controller circuit 38 is also provided for actuating an output stop circuit 39 to stop the supply output when the abnormal examining circuit 37 found the presence of abnormality. An alarm circuit 40 having e.g. an LED is coupled to the abnormal controller circuit 38 for displaying the abnormality by flashing the LED.

The operation of the battery charger of the second embodiment will be explained referring to the flow chart of FIG. 5.

In the charge mode, the two output terminals are coupled to a battery to be recharged and in the adaptor mode, they are connected to an external electric appliance. At Step S11, setting values of voltage and current in the over-current detector circuit 28, the over-voltage detector circuit 29, and the constant voltage circuit 30 for detection of abnormality in the charge or adaptor mode are determined which will then be distributed through the selector switch 23 by selecting the charge or adaptor mode.

When the charge mode is selected by the selector switch 23 at Step S12, the charging to the battery starts. In the charging, a series of the abnormality detection procedures are executed at Steps S14 to S17 after a delay of time initiated at Step S13. More specifically, the charge voltage and current are examined using the open terminal voltage detector circuit 26, the low-voltage detector circuit 27, the over-current detector circuit 28, and the over-voltage detector circuit 29. When a defect or fault is found by the abnormal examining circuit 37, the procedure moves to Step S18 where the output to the output terminals is canceled. Simultaneously, the alarm display is activated for indication of the abnormality at Step S19.

If no abnormality is found, it is examined whether the charging is completed or not at Step S20. More particularly, it is examined whether the charge voltage drops $\Delta V$. If not, the procedure returns to Step S14 to continue the charging.

When the selector switch 23 selects the adaptor mode at Step S12, the charger serves as a dc source for energizing the electric appliance coupled to the output terminals. Then, the detection of abnormality is carried out at Steps S21 and S22. If the abnormal examining circuit 37 detects abnormality from the charge voltage and current measured with the open terminal voltage detector circuit 26, the low-voltage detector circuit 27, the over-current detector circuit 28, and the over-voltage detector circuit 29, the procedure advances to Step S18 for canceling the output to the output terminal and then, to Step S19 for alarm display.

If no abnormality is detected, the dc supply is continued at Step S23 until the adaptor mode ends.

When common devices such as resistors and capacitors are employed rather than a microcomputer for construction of the circuitry arrangement of the battery charger, changes and modifications in the design, e.g. renewal of voltage or current setting values, will easily be made by replacing some of the devices.

As set forth above, the battery charger of the present invention cancels the output and simultaneously, displays an alarm sign when a defect or fault, e.g. fault connection to a battery, is detected from the measurements of charge voltage and current in either the charge or adaptor mode. This protective function of the battery charger will thus allow the charging to a battery and the power supply to an electric appliance to be carried out correctly.

It would be understood that the present invention is not limited to the embodiments of the battery charger above described and various changes and modifications will be possible without departing the scope and spirit of the present invention.

I claim:

1. A battery charger for charging a storage battery, comprising:

a current controller circuit for controlling the current of a charging energy supplied to the battery;

a voltage detector circuit for detecting the charge voltage to the battery;

a discharge circuit for discharging the battery; and a charge voltage examining circuit for activating the discharge circuit when the charge voltage stays in a specified range between upper and lower limits V1 and V2 after a period of time from the start of charging and then, starting recharging when the charge voltage is lower than the lower limit V2 of the specified range.

2. A battery charger according to claim 1, wherein the current controller circuit comprises a main charge circuit for performing a main charging action, a trickle charge circuit for supplying a trickle current to the battery after the main charging action is completed, and a charge end timer circuit for stopping the charging action after a predetermined maximum charge time is elapsed from the start of the charging.

3. A battery charger according to claim 2, further comprising a reset signal circuit for when the charge voltage is decreased by a given rate after reaching its peak value, producing a reset signal to stop the main charging action.

4. A battery charger according to claim 1, further comprising a preparatory charge timer circuit for activating the charge voltage examining circuit after the period of time from the start of the charging.

5. A battery charger according to claim 1, wherein the discharge circuit comprises a load for consuming the energy of the battery and a switch circuit for connecting and disconnecting a line between the load and the battery.

6. A battery charger accordingly to claim 1, wherein charging is continued without discharge when the charge voltage after the period of time from the start of the charging is lower than the lower limit of the specified range.

7. A battery charger according to claim 1, wherein the charge voltage examining circuit comprises an upper limit examining comparator circuit for detecting that the charge voltage V to the battery is lower than the upper limit V1 of the specified range and a lower limit examining comparator circuit for detecting that the charge voltage V is higher than the lower limit V2 of the specified range when VI<V is measured by the upper limit examining comparator circuit, so that a resultant output of the lower limit examining comparator circuit becomes an operation signal for activating the discharge circuit.

8. A battery charger according to claim 1, wherein the battery is a nickel-cadmium cell.

9. A battery charger according to claim 1, wherein the period of time from the start of the discharging is equal to one minute.

10. A battery charger according to claim 1, wherein a maximum charge time is about 20 hours.

* * * * *